(12) United States Patent
Roberts

(10) Patent No.: US 6,577,670 B1
(45) Date of Patent: Jun. 10, 2003

(54) PROGRAMMABLE FILTERING MECHANISM TO ALLOW BANDWIDTH OVERLAP BETWEEN DIRECT SEQUENCE SPREAD SPECTRUM COMMUNICATION DEVICE AND FREQUENCY-HOPPING TRANSMITTER

(75) Inventor: Richard D. Roberts, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 09/378,532

(22) Filed: Aug. 20, 1999

(51) Int. Cl.⁷ .......................... H04B 1/713; H04B 1/707
(52) U.S. Cl. ........................... 375/133; 375/140
(58) Field of Search ................. 375/130, 132, 375/133, 135, 136, 140; 370/320, 355, 342

(56) References Cited

U.S. PATENT DOCUMENTS

| | | | | |
|---|---|---|---|---|
| 4,665,404 A | * | 5/1987 | Christy et al. ............... 342/463 |
| 5,412,690 A | * | 5/1995 | Kotzin et al. ................ 375/256 |
| 5,577,066 A | * | 11/1996 | Schuchman et al. ........ 375/222 |
| 5,909,462 A | * | 6/1999 | Kamerman et al. ......... 375/147 |
| 6,320,896 B1 | * | 11/2001 | Jovanovich et al. ........ 375/130 |
| 6,377,608 B1 | * | 4/2002 | Zyren ......................... 375/132 |
| 6,381,053 B1 | * | 4/2002 | Fathallah et al. ........... 359/136 |

* cited by examiner

Primary Examiner—Young T. Tse
(74) Attorney, Agent, or Firm—Gary R. Stanford

(57) ABSTRACT

A controlled interference-avoidance, band-rejection filtering mechanism is installable in a direct sequence spread spectrum communication device (e.g., a DSSS radio). This controlled filtering mechanism monitors a potentially interfering frequency-hopping spread spectrum (FHSS) transmitter, to identify one or more frequencies to which the FHSS transmitter is expected to hop during a communication interval of the DSSS communication device. Based upon this frequency-hopping information, one or more spectral notches are programmed into the passband spectrum of a DSSS band-rejection filter, so as to exclude the potentially interfering frequencies from DSSS communication signals employed by the DSSS communication device during its communication interval.

11 Claims, 2 Drawing Sheets

PROGRAMMABLE FILTERING MECHANISM TO ALLOW BANDWIDTH OVERLAP BETWEEN DIRECT SEQUENCE SPREAD SPECTRUM COMMUNICATION DEVICE AND FREQUENCY-HOPPING TRANSMITTER

FIELD OF THE INVENTION

The present invention relates in general to wireless communication systems, such as particular wireless local area networks, and is particularly directed to a controlled interference-avoidance, band-rejection filtering mechanism that is installable in a direct sequence spread spectrum communication device (e.g., a DSSS radio). This controlled filtering mechanism monitors a potentially interfering frequency-hopping spread spectrum transmitter, to identify one or more frequencies to which the FHSS transmitter is expected to hop during a communication interval of the DSSS communication device. Using this frequency-hopping information, the controlled filtering mechanism programs one or more spectral notches into the passband spectrum of the band-rejection filter, so as to exclude the potentially interfering frequencies from DSSS communication signals employed by the DSSS communication device during its communication interval.

BACKGROUND OF THE INVENTION

Within the electromagnetic spectrum currently employed by wireless local area network (WLAN) devices there currently exists a potential bandwidth interference problem between relatively narrowband (1 Mbps) frequency hopping spread spectrum (FHSS) devices and wider bandwidth (11 Mbps) direct sequence spread spectrum (DSSS) devices. This problem essentially involves two incompatible wireless communication services attempting to use the same portion of the spectrum at the same time, due to the fact that a transmitting FHSS device will occasionally 'hop' into the passband of a DSSS device.

SUMMARY OF THE INVENTION

In accordance with the present invention, this potential spectrum usage collision problem is effectively obviated by installing a programmable band-rejection filter within the wider bandwidth DSSS communication device. No modification of the FHSS device is required. A filter control mechanism within an FHSS receiver monitors the operation of a potentially interfering FHSS transmitter, to identify one or more frequencies to which the FHSS transmitter is expected to hop during a communication interval employed by the DSSS communication device. Using this frequency-hopping information, the filter control mechanism programs one or more spectral notches into the passband characteristic of the band-rejection filter, so as to exclude the potentially interfering frequencies from being present in the DSSS communication signals of the DSSS communication device during its communication interval.

DETAILED DESCRIPTION

Figure 1:
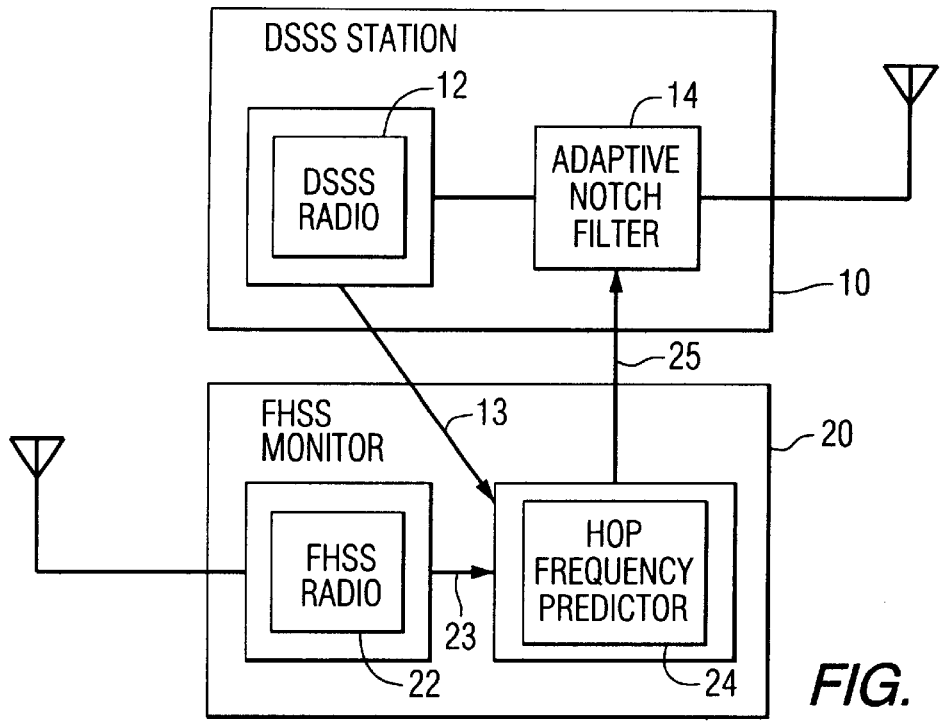
FIG. 1 diagrammatically illustrates a DSSS—FHSS system architecture of the interference-avoidance, band-rejection filtering mechanism of the present invention.

Before describing in detail the new and improved band-rejection filtering mechanism of the present invention, it should be observed that the invention resides primarily in prescribed arrangements of conventional digital communication circuits and associated digital signal processing components and attendant supervisory control circuitry therefor, that controls the operations of such circuits and components. In a practical implementation that facilitates their incorporation into existing printed circuit cards of a DSSS transceiver station, these modular arrangements may be readily implemented as field programmable gate array (FPGA)-implemented, or application specific integrated circuit (ASIC) chip sets.

Consequently, the configuration of such arrangements of circuits and components and the manner in which they are interfaced with other communication equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

Figure 2:
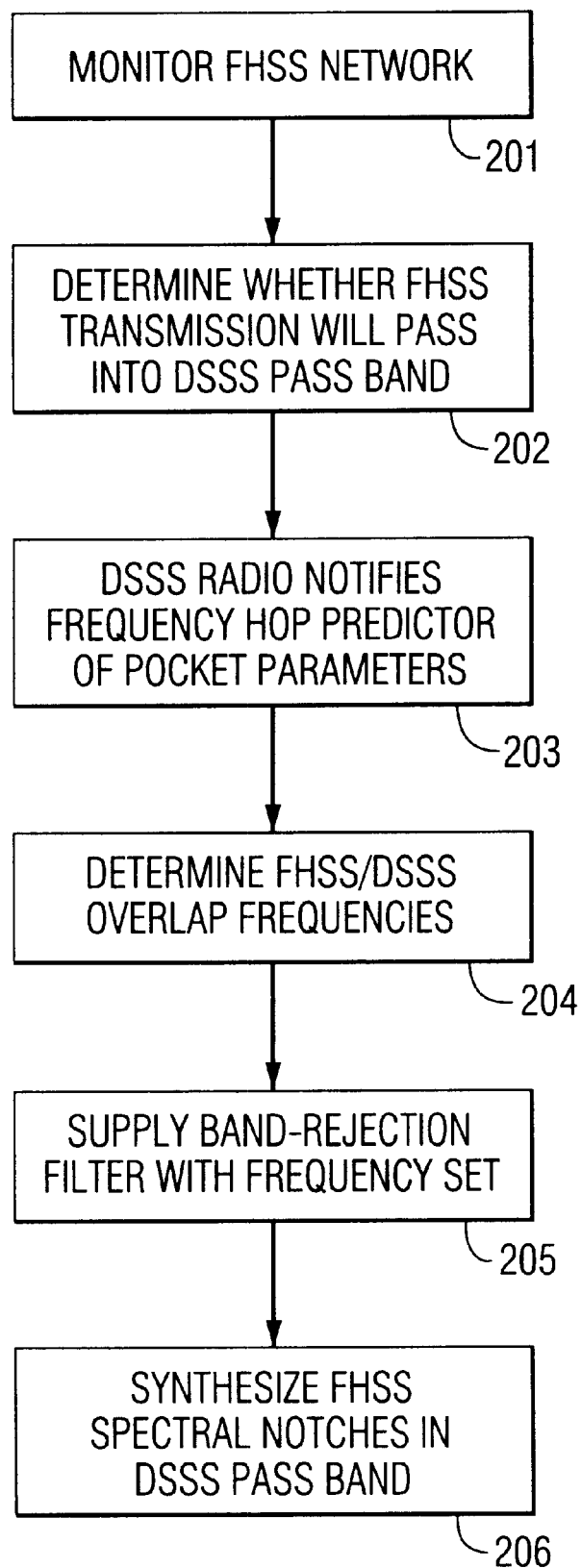
FIG. 2 is a flow chart of an algorithm for controlling the operation of the system of FIG. 1.

As pointed out briefly above, the controlled interference-avoidance, band-rejection filtering mechanism of the present invention, a system architecture of which is shown diagrammatically in FIG. 1, and the control algorithm therefor is shown in FIG. 2, to be described, is operative to monitor a potentially interfering FHSS transmitter that is presumed to be present within the same geographic area served by the DSSS system, in order to identify one or more frequencies to which the monitored FHSS transmitter is expected to hop during a respective DSSS packet interval. This monitoring mechanism is particularly attractive for use with FHSS wireless LANs that have 'predictable' frequency hopping patterns—which all commercial FHSS systems (such as IEEE 802.01, Home RF and BlueTooth) currently employ.

As illustrated in the system architecture diagram of FIG. 1, the present invention employs two system subcomponents—a DSSS radio station 10, containing a DSSS radio 12 that is actively participating in the DSSS network of interest, and an FHSS monitor unit 20, containing an FHSS radio 22 that is actively participating in the FHSS network being monitored. By actively participating is meant that the FHSS radio appears to the FHSS network as an FHSS node that never has traffic other than to occasionally ask for link management information.

The FHSS radio does not interfere with the DSSS system, nor does it receive interference from the DSSS system other than that associated with less than ideal spectral notches of a programmable band-rejection filter 14 installed in the transmit and receive signal path of the DSSS radio 12. As a non-limiting example, the band-rejection filter 14 may be implemented as a processor-synthesized digital filter, whose passband characteristic is controllably programmed with one or more spectral notches that effectively reject or exclude, from DSSS communication signals in the transmit or receive path of the DSSS radio 12, potentially interfering frequencies that are predicted by an FHSS-associated frequency hop predictor 24.

The FHSS frequency hop predictor 24 is coupled via a link 23 to the FHSS radio 22 and via a link 13 to the DSSS radio 12. The frequency hop predictor 24 may be implemented as a discrete digital signal processor (DSP) or as a software routine executed within the microcontroller of the FHSS radio 22. Because the FHSS radio 22 is an active participant within the FHSS network, the FHSS frequency hop predictor 24 is continuously being updated with frequency hopping and associated dwell time information for the FHSS network.

In addition, since it is coupled to the DSSS radio 12, at the beginning of either a DSSS transmit packet or a receive packet, the frequency hop predictor is informed of parametric information associated with the DSSS packet that is to be transmitted or received by the DSSS radio 12. This DSSS packet parametric information includes the time of occurrence of the packet, as well as the length of the packet. For DSSS transmit packets, the precise length of the packet is readily provided by the DSSS radio; for receive packets some maximal length may be prescribed.

Using these two sets of information from the DSSS radio 12 and the FHSS radio 22, the frequency hop predictor 24 of the FHSS monitor unit 20 determines whether a signal transmitted by the FHSS network will coincide with or overlap the DSSS spectrum during the transmission of a respective DSSS packet. If such overlap is expected, the frequency hop predictor identifies what frequencies will be employed by the FHSS network during packet transmission.

These identified frequencies are supplied as part of control information over a link 25 from the frequency hop predictor 24 to the programmable band-rejection filter 14 within the radio station 10. Using this control information, the control processor of the band-rejection filter 14 adjusts the synthesized bandpass characteristic of the filter to insert, for the duration of the DSSS packet of interest, spectral notches that are aligned with the respective frequencies identified by the FHSS frequency hop predictor 24.

Referring now to FIG. 2, respective steps of an operational control algorithm for the system of FIG. 1 include the continuous monitoring of the FHSS network by the FHSS radio 22 at step 201, to learn the network's frequency hopping pattern and the master clock time (i.e., dwell time information). Using this information and a priori knowledge of the frequencies being employed by the DSSS radio station 10, at step 202, the frequency hop predictor determines whether a signal transmitted by the FHSS network will pass into the passband of the DSSS radio. In step 203, at the beginning of a DSSS (transmit or receive) packet, the frequency hop predictor is notified via link 13 from the DSSS radio of the expected the time of occurrence of a packet, as well as the length of the packet.

Next, in step 204, using these two sets of information from the DSSS radio and the FHSS radio, the frequency hop predictor determines which frequencies of the frequency hopping sequence transmitted by the FHSS network (are predicted to) overlap the DSSS spectrum during the transmission of the DSSS packet. In step 205, this identified frequency set information is supplied to the programmable band-rejection filter 14 of the radio station 10. In step 206, the control processor of the band-rejection filter 14 uses this information to synthesize an associated set of spectral notches in the filter characteristic aligned with the respective frequencies identified by the FHSS frequency hop predictor.

Figure 3:
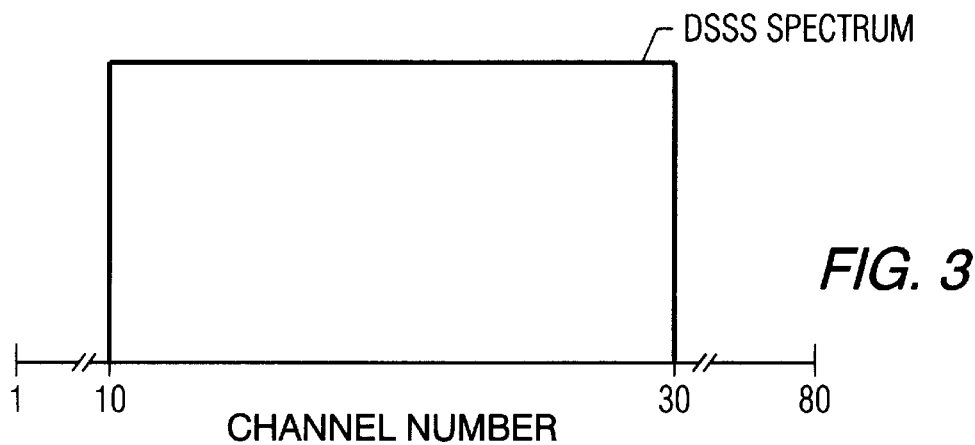
FIG. 3 shows a 20 MHz DSSS passband within an 80 MHz bandwidth frequency hopping spectrum.

As a non-limiting illustrative example, FIG. 3 shows a set of eighty, 1 MHz wide channels (numbered 1–80) that make up an 80 MHz bandwidth frequency hopping spectrum. It will be assumed that the DSSS radio employs 20 MHz of bandwidth, such as the illustrated 'block' of frequencies between 10 MHz and 30 MHz. If there were no potential FHSS interference problem or sources of interference, such as but not limited to multipath, the DSSS radio's bandpass filter would have a passband characteristic substantially as shown by this block. It will be further assumed that the monitored FHSS transmitter utilizes the entire 80 MHz bandwidth, in respective one MHz hops that follow some pseudorandom hopping pattern, and that this frequency-hopping pattern includes transitions to channels 15 and 20 during spaced-apart-in-time segments of the DSSS packet.

In particular, it will be assumed that at approximately one-quarter of the way through the DSSS packet, the FHSS transmitter hops from a frequency outside the DSSS passband to channel 15, dwells there for a short period of time, and then hops out of the DSSS (20 MHz) passband. Subsequently, at approximately three-quarters of the way through the DSSS packet, the FHSS transmitter is expected or predicted to hop to channel 20, dwell there for a short period of time, and then again hop out of the DSSS passband, never to reappear with the 20 MHz passband during the DSSS packet of interest.

Figure 4:
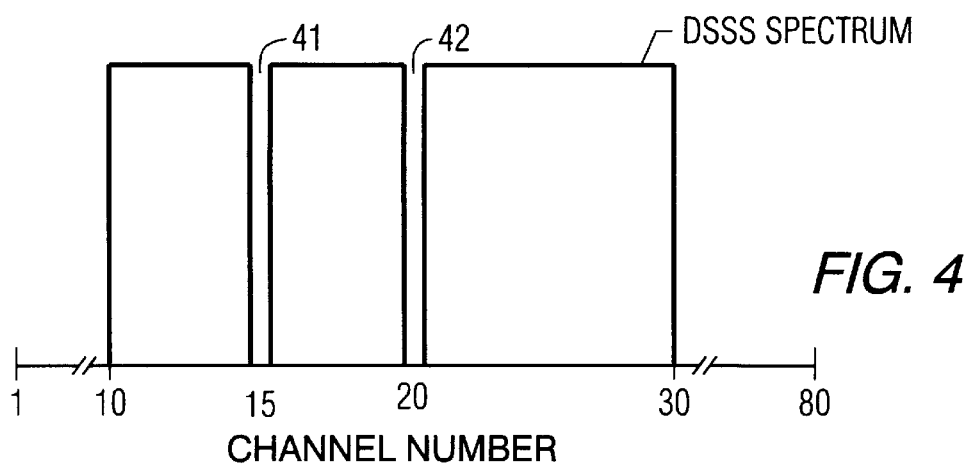
FIG. 4 shows the DSSS passband of FIG. 3 containing a pair of spectral notches at prescribed FHSS channels.

In order to prevent interference with these two FHSS channels, the packet must be controllably filtered to excise channels 15 and 20 from the DSSS passband. This is diagrammatically illustrated in FIG. 4, which shows a pair of spectral notches 41 and 42, that have been inserted into the 20 MHz wide DSSS channel bandwidth of the spectral diagram of FIG. 3, and are respectively aligned with channels 15 and 20. As described above, these filter notches are controllably synthesized into the band-rejection filter's passband characteristic based upon the two sets of information from the DSSS radio and the FHSS radio.

As will be appreciated from the foregoing description of the present invention, the potential bandwidth interference problem between relatively narrowband frequency hopping spread spectrum devices and wider bandwidth direct sequence spread spectrum devices can be effectively prevented by installing a programmable band-rejection filter within the wider bandwidth DSSS communication device, without requiring any modification of the FHSS device. By monitoring the operation of a potentially interfering FHSS transmitter to identify one or more frequencies to which the FHSS transmitter is expected to hop during a communication interval employed by the DSSS communication device, a filter control mechanism is able to programs one or more spectral notches into the passband characteristic of the band-rejection filter, and thereby exclude the potentially interfering frequencies from DSSS communication signals of the DSSS communication device.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A method of preventing a frequency-changing transmitter from potentially interfering with the operation of a direct sequence spread spectrum (DSSS) communication device comprising the steps of:

(a) providing first information representative of one or more frequencies that said frequency-changing transmitter is expected to use during a communication interval of said DSSS communication device, including monitoring the operation of said frequency-changing transmitter to identify said one or more frequencies transmittable by said frequency-changing transmitter during said communication interval of said DSSS communication device; and (b) causing the frequency content of DSSS communication signals employable by said DSSS communication device during said communication interval to be exclusive of said one or more frequencies, including controllably synthesizing a notch filter of said DSSS communication device to form one or more notches in the passband spectrum thereof at respective one or more frequencies identified in step (a), and thereby cause said notch filter to exclude said one or more frequencies from said frequency content of said DSSS communication signals employable by said DSSS communication device during said communication interval.

2. A method of preventing a frequency-hopping transmitter from potentially interfering with the operation of a direct sequence spread spectrum (DSSS) communication device comprising the steps of:

(a) providing first information representative of one or more frequencies that said frequency-hopping transmitter is expected to use during a communication interval of said DSSS communication device, including monitoring the operation of said frequency-hopping transmitter to identify said one or more frequencies transmittable by said frequency-hopping transmitter during said communication interval of said DSSS communication device; and (b) causing the frequency content of DSSS communication signals employable by said DSSS communication device during said communication interval to be exclusive of said one or more frequencies, including controllably programming a programmable notch filter of said DSSS communication device to form one or more notches in the passband spectrum thereof, respectively corresponding to said one or more frequencies, and thereby exclude said one or more frequencies from said frequency content of said DSSS communication signals employable by said DSSS communication device during said communication interval.

3. An arrangement for preventing a frequency-changing transmitter from potentially interfering with the operation of a direct sequence spread spectrum (DSSS) communication device comprising:

a receiver which is operative to monitor the operation of said frequency-changing transmitter and identify one or more frequencies that the frequency-changing transmitter is expected to use during a communication interval of said DSSS communication device; and a programmable band rejection filter which is coupled in the signal transport path of DSSS communication signals employable by said DSSS communication device, and is controllably programmable to synthesize one or more notches in a passband spectrum thereof at said one or more frequencies identified by said receiver, and thereby cause said band rejection filter to exclude said one or more frequencies from said frequency content of said DSSS communication signals transportable through signal transport path of said DSSS communication device during said communication interval.

4. An arrangement according to claim 3, wherein said frequency-changing transmitter comprises a frequency-hopping transmitter.

5. An arrangement according to claim 4, wherein said receiver comprises a frequency-hopping receiver, which is operative to receive signals transmitted by said frequency-hopping transmitter and to identify said one or more frequencies transmitted thereby during said communication interval, and further including a filter controller which is coupled to said frequency-hopping receiver and said spread spectrum communication device, and is operative to generate control signals for programming said one or more notches in the passband spectrum of said programmable band rejection filter.

6. A direct sequence spread spectrum (DSSS) station, comprising:

a DSSS radio operative in a predetermined frequency spectrum;

an adaptive band-rejection filter, coupled in the signal path of said DSSS radio, capable of filtering one or more frequencies within the frequency spectrum of the DSSS radio; and a frequency hop spread spectrum (FHSS) monitor unit, coupled to said DSSS radio and said adaptive band-rejection filter, that is operative to monitor an FHSS network that employs a plurality of narrowband frequency channels, that determines whether the FHSS network will interfere with operation of the DSSS radio, and that identifies any potentially interfering frequency channels to said adaptive band-rejection filter;

wherein said adaptive band-rejection filter filters said any potentially interfering frequency channels within said frequency spectrum of the DSSS radio.

7. The DSSS station of claim 6, wherein said adaptive band-rejection filter comprises a processor-synthesized digital filter having a passband characteristic that is controllably programmed to exclude one or more spectral notches from said frequency spectrum of the DSSS radio.

8. The DSSS station of claim 6, wherein said FHSS monitor unit comprises:

an FHSS radio; and a hop frequency predictor, coupled to said FHSS radio, said DSSS radio and said adaptive band-rejection filter.

9. The DSSS station of claim 8, wherein said FHSS radio participates in said FHSS network without interfering with said DSSS radio and provides frequency hopping and associated dwell time information to said hop frequency predictor.

10. The DSSS station of claim 9, wherein said hop frequency predictor receives DSSS packet parametric information from said DSSS radio.

11. The DSSS station of claim 10, wherein said DSSS packet parametric information includes packet occurrence time and packet length.

* * * * *